United States Patent [19]
Wexler

[11] 3,842,327
[45] Oct. 15, 1974

[54] SOLID STATE START AND CONTROL CIRCUIT FOR A. C. MOTOR

[75] Inventor: Joseph S. Wexler, Wilmette, Ill.

[73] Assignee: North American Philips Corporation, Skokie, Ill.

[22] Filed: Oct. 25, 1973

[21] Appl. No.: 409,423

[52] U.S. Cl. .............................. 318/221 E, 318/227
[51] Int. Cl. ............................................. H02p 1/44
[58] Field of Search ............ 318/221 R, 221 E, 227

[56] References Cited
UNITED STATES PATENTS

| | | | |
|---|---|---|---|
| 3,657,620 | 4/1972 | Fricker | 318/221 E |
| 3,657,621 | 4/1972 | Fink et al. | 318/221 E |
| 3,728,601 | 4/1973 | Fricker et al. | 318/221 E |

*Primary Examiner*—G. Z. Rubinson
*Attorney, Agent, or Firm*—Frank R. Trifari

[57] ABSTRACT

A starting and controlling circuit for a split phase a.c. motor is disclosed. The circuit employs solid state circuitry for all high level switching and is actuatable by a low-level d.c. logic signal. The start winding and starting capacitor are switched out of the starting circuit by means of an inductor which controls the switching of a triac switch.

7 Claims, 1 Drawing Figure

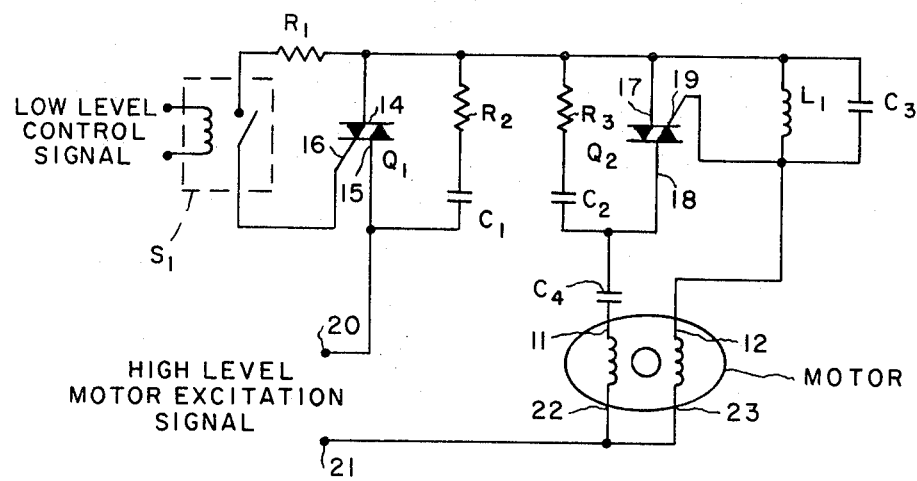

SOLID STATE START AND CONTROL CIRCUIT FOR A. C. MOTOR

This application relates to circuits for starting a.c. motors and, more particularly, low level, solid state circuitry for starting a.c. split phase motors.

It has been common to use a centrifugal motor starting electro-mechanical switch or an electro-mechanical motor starting relay for starting split phase motors. In this application, a heavy current "start" winding is used to start the motor which is removed from the circuit by the electro-mechanical switch after the motor builds up speed. Subsequently, only the "run" winding is excited. Electro-mechanical devices are generally bulky, have limited life and may prove unusable in an atmosphere where arcing is impermissible.

More recently, efforts have been made to start such split phase motors using solid state devices. These circuits tend to be either excessively complex or still require a high level mechanical switch to connect the a.c. line to the circuit.

It is accordingly an object of the present invention to provide a simple, substantially all solid state starting circuit for split phase motors.

It is additionally an object of the present invention to provide a controllable circuit having only a single low level mechanical switch for starting a split phase a.c. motor.

It is also an object of the present invention to provide a starting and controlling circuit for a split phase a.c. motor actuatable by a standard d.c. logic signal.

Other objects of the present invention will become apparent by reference to the following description and drawings while the scope of the invention will be pointed out in the appended claims.

In accordance with the present invention, a circuit for controlled starting of an a.c. driven motor having a two-terminal start winding and a two-terminal run winding comprises a first bilateral controllable semiconductor switch having first and second main electrodes and a control electrode. The first main electrode of the switch is adapted to being coupled to one terminal of the start winding of the motor. The control electrode is adapted to being connected to one terminal of the run winding. The circuit includes means connected between the control electrode of the first switch and the second main electrode of the first switch, which is responsive to the current through the run winding for developing a voltage inversely related to the speed of the motor. A second bilateral controllable semiconductor switch having fist and second main electrodes and a control electrode is also included, the second electrode being coupled to the second electrode of the first semiconductor switch. Means are included for coupling a first terminal of said high level a.c. signal source to the other terminals of the start and run windings and for coupling a second terminal of the high level signal source to the first main electrode of the second semiconductor switch. Also included is a low-level controlled switch for coupling the control electrode of the second semiconductor switch with the second main electrode of the second semiconductor switch.

The sole FIGURE illustrates in schematic form the principal embodiment of the present invention.

Referring to the FIGURE, a circuit for controlled starting of an a.c. driven motor is illustrated. The motor shown in the FIGURE as element 13 includes two terminal start winding 11 and two terminal run winding 12. The circuit includes a first bilateral controllable semiconductor switch shown as triac $Q_2$. Triac $Q_2$ includes a first main electrode 18, a second main electrode 17 and a control electrode shown as gate 19. Electrode 18 is adapted to being coupled to the start winding 11, preferably through starting capacitor $C_4$. The gate electrode 19 is adapted to being connected to one terminal of the run winding 12.

The circuit includes means connected between gate 19 and electrode 17 which is responsive to the current through the run winding for developing a voltage inversely related to the speed of the motor indicated as inductor $L_1$. A second bilateral controllable semiconductor switch, triac $Q_1$, has a first main electrode 15, a second main electrode 14, and a control electrode, gate 16. Electrode 14 is coupled to the electrode 17 of $Q_2$.

Means for coupling a first terminal of a high level a.c. signal source to the other terminals 22 and 23 of the start and run windings and for coupling a second terminal of the high level signal source to the first main electrode 15 of triac $Q_2$ are shown as 20 and 21 in the FIGURE. A low level controlled switch for coupling gate electrode 16 of $Q_1$ with electrode 14 of $Q_2$, preferably through resistor $R_1$, is also included as switch $S_1$.

Provision for noise immunity and prevention of erratic actuation of the motor is illustrated as $C_3$. Means to prevent false firing of the triacs are illustrated as networks $R_2 - C_1$ and $R_3 - C_2$ and are connected across the main electrodes of triacs $Q_1$ and $Q_2$ respectively.

In operation, the motor control circuit performs in the following way. A low level control signal is applied to $S_1$ which actuates the switch, closing the single pole, single throw contact. The closure of $S_1$ causes triac $Q_1$ to change from a nonconducting to a conducting state. The function of $R_1$ is to limit the current to the gate 16 of triac $Q_1$ and also through the contacts of switch $S_1$. The series network composed of $R_2$ and $C_1$ functions as a "snubber network" which limits the rate of rise of voltage across triac $Q_1$ to prevent false firing and also to aid in the turnoff of triac $Q_1$.

When $Q_1$ begins to conduct, a surge of a.c. current commences through run winding 12 by way of inductor $L_1$. The amplitude of this current is determined by the circuit impedance (primarily the value of $L_1$) and the motor's locked rotor impedance. The voltage developed from gate 19 to electrode 17 is dependent on the rate of change of current through $L_1$. The initial surge of current through $L_2$ turns on triac $Q_2$ which permits current to flow in the start winding. The motor 13 then begins to turn and as it gathers speed the impedance across the run winding increases. This increase of impedance lowers the current through inductor $L_1$. At a preselected speed where the motor no longer requires the start winding for rotation, the voltage developed across $L_1$ will be too small to maintain triac $Q_2$ in its "on" state. $Q_2$ thus turns "off", effectively removing the start winding from the circuit.

The series network of $R_3$ and $C_2$ performs the same function for triac $Q_2$ as $R_2$ and $C_1$ does for triac Q. Capacitor $C_3$ functions as a high pass filter which prevents transients from false actuation of triac $Q_2$.

In a preferred form of the invention, switch $S_1$ is a reed relay and is actuatable by a low level d.c. signal. Such a device is capable of being actuated directly from a digital logic stage, which is a major advantage of the present invention.

In one example of the present invention, the circuit was used to start and control a G. E. motor type 5KC19FG44AT, which is a split phase capacitor start, induction run motor. The parameters of the motor are such that with a locked rotor, the run winding will carry 10.5 amps at 120 volts, 60 hz; at full load, the run winding will carry 2.6 amps at 120 volts, 60 hz.

Other nominal parameters of this example of the present invention are:
$R_1 = 100\Omega$
$R_2 = 100\Omega$
$R_3 = 100\Omega$
$C_1 = 0.1\mu fd$
$C_2 = 0.1\mu fd$
$C_3 = 0.001\mu fd$
$L_{L1} = 80$ microhenries With the above circuit parameters, the starting time of the motor is typically about 800 milliseconds.

As can be seen from the above description, the present invention provides a simple solid-state switch for starting and controlling a split phase a.c. motor directly from low devel d.c. logic circuitry. All high level switching is performed completely by solid state means.

The circuitry includes a novel and simple arrangement for effecting accurate cutout of the starting winding which further includes the effective disconnection of the starting capacitor as well. Appropriate employment of high frequency filtering provides advantageous noise immunity for the circuit.

While the present invention has been particularly shown and described with reference to the preferred embodiments thereof, it will be understood by those skilled in the art that various modifications and changes in form and detail may be made therein without departing from the true spirit and scope of the present invention.

What is claimed is:

1. A circuit for controlled starting of an a.c. driven motor having a two-terminal start winding and a two-terminal run winding comprising:

a first bilateral controllable semiconductor switch having first and second main electrodes and a control electrode, said first main electrode adapted to being coupled to one terminal of said start winding of said motor, said control electrode adapted to being connected to one terminal of said run winding;

means connected between the control electrode of said first switch and the second main electrode of said first switch responsive to the current through the run winding for developing a voltage inversely related to the speed of the motor;

a second bilateral controllable semiconductor switch having first and second main electrodes and a control electrode, said second electrode being coupled to the second electrode of said first semiconductor switch;

means for coupling a first terminal of a high level a.c. signal source to the other terminals of said start and run windings and for coupling a second terminal of said high level signal source to the first main electrode of said second semiconductor switch; and a low-level, controlled switch for coupling the control electrode of the second semiconductor switch with the second main electrode of said second semiconductor switch.

2. The circuit of claim 1 wherein said semiconductor switches are triacs.

3. The circuit of claim 1 wherein said means for developing a speed responsive voltage is an inductor.

4. The circuit of claim 1 wherein a capacitor is included between the control electrode and the second main electrode of said first semiconductor switch.

5. The circuit of claim 1 wherein said low-level controlled switch is a d.c. controlled reed relay having a single pole, single throw contact.

6. The circuit of claim 5 wherein said single pole, single throw contact is in series with a current-limiting resistor.

7. The circuit of claim 1 which includes a series circuit of a resistor and capacitor, one of such series circuits being connected across the main electrodes of each of the semiconductor switches.

* * * * *